3,089,883
ESTERS OF ACYLAMINOCARBOXYLIC ACIDS

Manfred Dohr, Dusseldorf, and Horst-Jürgen Krause and Carl Wulff, Dusseldorf-Benrath, Germany, assignors to Henkel & Cie. G.m.b.H., Dusseldorf-Holthausen, Germany, a corporation of Germany
No Drawing. Filed July 7, 1958, Ser. No. 746,606
Claims priority, application Germany July 11, 1957
9 Claims. (Cl. 260—404)

This invention relates to the production of synthetic waxes and provides novel esters and novel wax compositions containing these novel esters.

A primary object of the invention is to provide an inexpensive hard wax which is compatible with paraffin wax, has good solvent binding power and can be used as a replacement for the expensive hard wax presently included in paraffin waxes used, for example, for floor and shoe polishing.

It has been found that esters of acylaminocarboxylic acid and long chain monohydric alcohols or polyhydric alcohols can be used for the purposes of the invention.

The aminocarboxylic acids suitable for the purposes of the invention are of the formula:

$$R-CO-(NH-(CH_2)_n-CO)_x-OH$$

wherein R is a hydrocarbon radical other than a fully aromatic hydrocarbon radical, $n$ is a whole number of from 3 to 20, conveniently 5, 7 or 10, and $x$ is a whole number of at least 1 and preferably not more than 3. Desirably $x$ is 1.

The acylaminocarboxylic acids can be prepared from lactams by reacting therewith carboxylic acids, and can be prepared by the method of United States application Serial No. 677,236, filed August 9, 1957, now Patent No. 2,956,068. Alternatively, they can be prepared in known manner by reacting the acyl halides of higher fatty acids with aliphatic amino carboxylic acids in the presence of agents which combine with acid.

Suitable carboxylic acids for providing the radical R in the above formula are those containing a hydrocarbon radical other than a fully aromatic hydrocarbon radical. The hydrocarbon radical can be aliphatic, cycloaliphatic or hydroaromatic. The radical can contain an aromatic moiety. For example the radical can be joined to the carboxyl group through an aromatic radical. The straight chain and branched chain saturated and unsaturated fatty acids of natural or synthetic origin are particularly well suited for the purposes of the invention. The radical can contain from about 10 to 40 carbon atoms and preferably contains 16 to 24 carbon atoms.

The aminocarboxylic acid can be of such composition that $n$ in the above formula is 3–20. Advantageously, where the acids are derived from lactams, the lactams contain from 5 to 9 ring atoms in the heterocyclic ring system. Suitable lactams are butyryl lactam, valerolactam, caprolactam, and methylcaprolactam.

Preferred acylaminocarboxylic acids are acylaminocaproic acids having caprolactam radical. Stearylaminocaproic acid and stearylaminoundecanoic acid are well suited for the purposes of the invention. A preferred ester is the behenylalcoholester of stearylaminocaproic acid. Behenylalcohol is derivable by hydrogenation of rape oil and contains 18 to 22 carbon atoms.

As alcohol component of the esters of the invention there are suitable all long-chain monohydric alcohols. For example, suitable alcohols are monohydric alcohols containing at least about 8 carbon atoms, for example monohydric alcohol containing 12 to 18 carbon atoms such as lauryl alcohol, stearyl alcohol, oleyl alcohol, behenyl alcohol, montanyl alcohol, wax alcohols and their technical mixtures, as well as higher molecular branched-chain primary saturated aliphatic alcohols, obtained for instance by condensation of aliphatic alcohols in the presence of the alkali by the method of Guerbet.

In condensation by the Guerbet method, the hydroxyl group of an alcohol molecule reacts with a hydrogen atom present on the 2 carbon atom of the other alcohol molecule with the splitting off of water and the formation of branched alcohol of higher molecular weight which contains in the molecule the same number of carbon atoms as contained together by the two starting alcohols from which the new alcohol has formed. Assuming that the initial alcohol had the formula $C_pH_{2p+1}OH$, then the alcohol formed has the formula

in which $p$ is a whole number from 8 to 30, preferably 10 to 24, and $q$ is a whole number which is 2 smaller than the number $p$.

Polyhydric alcohols such as ethylene glycol, propane diol, butane diol, hexane diol, cyclohexane diol, diethylene glycol, trimethylol ethane, trimethylol propane, glycerine, pentaerythritol and sorbitol can also be used for the esterification of the acid component.

The reaction of the acylaminocarboxylic acids with the alcohols can be carried out in accordance with the known methods by melt-condensation in the presence of an inert gas or by azeotropic esterification with an entrainment agent, both at elevated or at reduced pressure. The reaction can also be effected in the presence of the known acid or basic esterification catalysts.

The quantity ratios of alcohol to acid components are preferably so selected that the number of carboxyl groups corresponds to the number of hydroxyl groups of the alcohol. The esterification is in general complete when the reaction product still has only an acid number of about 10–30. The unreacted free acid can be converted into magnesium, calcium, aluminum or zinc salts. This is particularly true when employing an excess of acid. A wax ester obtained in this manner can in general be used with the slight traces of free acylaminocarboxylic acid or its salts which still adhere to it. In the case of higher polyalcohols such as pentaerythritol and sorbitol, it is advisable to esterify with an excess of alcohol.

The esters of acylaminocarboxylic acids obtained in this manner, and particularly esters from acylaminoundecanoic acid, constitute excellent hard waxes which are vested with good solvent-binding power, are entirely compatible with paraffin wax and can replace with equivalent effect the expensive hard wax in the known mixtures for floor and shoe polishing agents. The synthetic waxes in accordance with the invention can be used for instance for floor waxes, leather dressing agents, furniture and automobile polishes, etc. The pastes prepared with the synthetic waxes of the invention are characterized by shiny surface film, good paste hardness and excellent gloss-imparting properties.

Thus the invention provides wax compositions comprising a paraffin wax, a wax solvent, and an acylaminocarboxylic acid ester according to the invention.

The invention will now be described by way of specific embodiments. These are set forth in the following examples.

Example I

A known standard paste of the following composition was prepared:
(A) 11.5 parts by weight hard paraffin, melting point 54–56° C.
(B) 0.5 part by weight of ozokerite.
(C) 1.5 parts by weight of a commercial wax of a melting point 102–106° C. acid number 10–15, saponification number 110–125, consisting predominantly of the butyleneglycolester of montanic acid.

(D) 1.5 parts by weight of a commercial ester wax having the following data: Melting point 73–76° C., acid number 6–10, saponification number 95–105.

These components were melted together and stirred with 35 parts by weight of mineral spirits of a temperature of about 80° C.

Waxes C and D are replaced as desired by the ester of the invention to be tested.

80 parts stearoylaminocaproic acid (0.2 mol) are esterified with 54 parts of tallow alcohol (0.2 mol) in the presence of 1 part p-toluenesulfonic acid of 200° C. in a stream of nitrogen for eight hours. There is obtained a hard white wax which has a melting point of 80–83° C.

Upon replacement of C, the standard paste becomes somewhat softer, while upon the replacement of D a very hard paste with an excellent bright surface is obtained which produces an excellent permanent polish on linoleum.

*Example II*

60 parts by weight of stearoylamino caproic acid (0.15 mol) are heated with 7 parts by weight butanediol-1,4 (0.075 mol) in the presence of 0.5 part by weight p-toluenesulfonic acid for eight hours in a stream of nitrogen at 150° C. Thereupon, the esterification is continued for a further four hours at the same temperature in the vacuum produced by an oil pump.

A hard wax having an acid number 27 is obtained.

This compound is treated with the quantity of calcium hydroxide calculated on basis of the acid number and heated for a further three hours at 160° C. in the vacuum produced by an oil pump.

The slightly yellow wax has a melting point of 101 to 105° C. D can be substituted in the standard paste without change in the properties.

*Example III*

198 parts by weight of the reaction product of stearic acid with caprolactam which was prepared in accordance with U.S. application Serial No. 677,236, filed August 9, 1957, issued to Patent No. 2,956,068 on October 11, 1960 are stirred with 20 parts by weight of pentaerythritol in the presence of 3 parts by weight p-toluenesulfonic acid first of all for 1 hour at 120° C. in a stream of nitrogen and then heated for a further 5 hours in a stream of nitrogen at 180–190° C. There is obtained a glass-hard wax which has a melting point of 61 to 65° C. and an acid number of 27. The yellowish wax gives a hard, salve-like standard paste of a bright surface polish which can replace D of the standard paste.

*Example IV*

194 parts by weight of an acylamino caproic acid having an acid number of 145 prepared from a hydrogenated tallow fatty acid and caprolactam are esterified with 18 parts by weight of pentaerythritol and 2 parts by weight of toluenesulfonic acid for one hour while stirring at 120° C. and a further eight hours in a stream of nitrogen at 180° C. Thereupon the reaction mixture is treated at 200° C. under the vacuum produced by an oil pump.

There is obtained a slightly colored wax of a melting point of 85–94° C., an acid number of 23 and a saponification number 143, which can advantageously replace the component D of the standard paste with the same consistency very good surface layer and excellent high polishing properties.

*Example V*

70.2 parts by weight of stearoylamino undecanoic acid (0.15 mol) are heated with 7 parts by weight of butanediol-1,3 (0.075 mol) in the presence of 0.5 part by weight p-toluenesulfonic acid as esterification catalyst for 8 hours in a stream of carbon dioxide at 160° C. Thereupon, the esterification is continued for a further three hours at the same temperature in a vacuum produced by an oil pump.

There is obtained a very hard white wax of a melting point of 89 to 94° C. Its acid number is 13. The wax gives a very hard salve-like test paste with a bright surface layer which can advantageously replace components C and D of the standard paste. The wax has excellent polish imparting properties and produces a very permanent gloss.

*Example VI*

70.2 parts by weight stearoylamino undecanoic acid (0.15 mol) are heated with 51 parts by weight of a technical fatty alcohol (0.15 mol) of a hydroxyl number of 165 (obtained from hydrogenated rape oil) in the presence of 1 part by weight p-toluenesulfonic acid as esterification catalyst for four hours in a stream of carbon dioxide at 150° C. Thereupon the esterification is continued for a further six hours at the same temperature in the vacuum produced by an oil pump.

There is obtained a very hard yellowish white wax of a melting point of 90 to 91° C. Its acid number is 11. The wax gives an excellent test paste and can advantageously replace components C and D of the standard paste. The wax which is excellently compatible with paraffin in different mixture ratios also has very excellent polish-imparting properties.

*Example VII*

165 parts by weight of the methylester of stearylaminocaproic acid (0.4 mol) are alcoholized with 18 parts by weight of butane diol-1,3 (0.2 mol) in the presence of 0.16 gram sodium methylate at 150° C. for five hours in the vacuum produced by a waterjet pump. The methyl alcohol is distilled off in this connection through a column.

There is obtained a very hard slightly colored wax of a melting point of 74–76° C.

We claim:

1. Esters of acylaminocarboxylic acids of the formula:

$$R-CO-(NH-(CH_2)_n-CO)_x-OH$$

wherein R is an alkyl radical having from 10–40 carbon atoms, $n$ is a whole number from 5–18, $x$ is a whole number from 1–3, and an alcohol selected from the group consisting of monohydric alcohols containing from 8–60 carbon atoms and polyhydric alcohols having from 2 to 6 carbon atoms.

2. Esters of acylaminocarboxylic acids selected from the group consisting of stearylaminocaproic acid and an alcohol selected from the group consisting of monohydric alcohols containing 12–18 carbon atoms, and polyhydric alcohols containing 2–6 carbon atoms.

3. The monoester of stearylaminocaproic acid and tallow alcohol.

4. The diester of stearylaminocaproic acid and butanediol 1,4.

5. The polyester of stearylaminocaproic acid and pentaerythritol.

6. The polyester of tallow fatty acid acylaminocaproic acid and pentaerythritol.

7. The diester of stearylaminoundecanoic acid and butanediol 1,3.

8. The monoester of stearylaminoundecanoic acid and a mixture of fatty alcohols containing from 18 to 22 carbon atoms.

9. The diester of stearylaminocaproic acid and butanediol 1,3.

References Cited in the file of this patent

UNITED STATES PATENTS

| | | |
|---|---|---|
| 2,063,987 | Dreyfus | Dec. 15, 1936 |
| 2,277,152 | Schlack | Mar. 24, 1942 |
| 2,342,520 | Stickdorn | Feb. 22, 1944 |
| 2,534,129 | Howe | Dec. 12, 1950 |
| 2,607,783 | Turinsky | Aug. 19, 1952 |
| 2,625,489 | Keating | Jan. 13, 1953 |
| 2,686,795 | Koehner | Aug. 17, 1954 |
| 2,762,775 | Foehr | Sept. 11, 1956 |

UNITED STATES PATENT OFFICE
CERTIFICATE OF CORRECTION

Patent No. 3,089,883　　　　　　　　　　　　　　May 14, 1963

Manfred Dohr et al.

It is hereby certified that error appears in the above numbered patent requiring correction and that the said Letters Patent should read as corrected below.

Column 2, line 6, after "of", second occurrence, insert -- a --; column 4, line 47, before "an alcohol" insert -- stearylaminoundecanoic acid and --.

Signed and sealed this 14th day of January 1964.

(SEAL)
Attest:
ERNEST W. SWIDER
Attesting Officer

EDWIN L. REYNOLDS
Acting Commissioner of Patents